United States Patent [19]

Burrows

[11] Patent Number: 5,045,197

[45] Date of Patent: Sep. 3, 1991

[54] REVERSE OSMOSIS PURIFICATION SYSTEM WITH UNITARY HEADER MANIFOLD

[76] Inventor: Bruce D. Burrows, 25581 Via Paladar, Valencia, Calif. 91355

[21] Appl. No.: 562,239

[22] Filed: Aug. 3, 1990

[51] Int. Cl.$^5$ .............................................. B01D 61/08
[52] U.S. Cl. ............................. 210/321.78; 210/321.87
[58] Field of Search ............... 210/195.1, 416.3, 195.2, 210/321.6, 321.64, 232, 322, 321.78, 321.87

[56] References Cited

U.S. PATENT DOCUMENTS 4,784,763 11/1988 Hambleton et al. ............. 210/416.3

Primary Examiner—Frank Sever
Attorney, Agent, or Firm—Kelly, Bauersfeld & Lowry

[57] ABSTRACT

A reverse osmosis water purification system is provided for removing contaminants from a tap water supply or the like, to produce a relatively purified water supply. The system includes a header manifold formed as a unitary component and adapted to receive and support a plurality of removable cylindrical canisters having a reverse osmosis cartridge and associated filter cartridges installed therein. The manifold is formed with a main gallery passage which is subdivided into a succession of bores of progressively increasing diametric size, with adjacent bores being separated by transition segments of uniform thread pitch. Appropriate threading plugs and/or check valves and the like are installed along the gallery passage to regulate water flow in series through the reverse osmosis and filter cartridges to separate the tap water supply into the relatively purified water supply and a reject water supply having impurities concentrated therein. The manifold further connects the purified water supply to an appropriate storage vessel and/or for dispensing via a faucet valve. or the like, and discharges the reject water supply to a drain. Each of the cylindrical canisters is easily removed from the manifold to facilitate periodic replacement of the reverse osmosis or filter cartridges contained therein.

26 Claims, 5 Drawing Sheets

REVERSE OSMOSIS PURIFICATION SYSTEM WITH UNITARY HEADER MANIFOLD

BACKGROUND OF THE INVENTION

This invention relates generally to improvements in water purification systems and equipment of the reverse osmosis type. More particularly, this invention relates to an improved purification system having a header manifold of simplified unitary construction for receiving and supporting system components in a compact package or assembly.

Reverse osmosis water purification systems are generally well-known in the art for producing a purified water supply used for drinking, cooking, etc. Such purification systems commonly include a reverse osmosis unit having a reverse osmosis filter or membrane which, in the presence of appropriate flow and pressure conditions, separates an incoming tap or feed water supply into the purified water supply and a relatively impure or reject water supply. In particular, the membrane functions to remove particulate matter and a wide range of dissolved solids and other contaminants from a portion of the tap water to produce the purified water supply, and to concentrate those contaminants within the remainder of the tap water thereby producing the reject supply, sometimes referred to as brine, for disposal via a suitable drain. The purified water supply is normally collected for storage at a convenient location within a suitable reservoir, and for ready dispensing through a faucet valve or the like, when desired. In this regard, available reverse osmosis systems have utilized compressed air to deliver purified water from the reservoir as described, for example, in U.S. Pat. No. 4,834,873. Alternately, such systems have been designed to use the pressure of the tap water supply to deliver purified water from the reservoir as described, for example, in U.S. Pat. No. 4,776,952.

In many reverse osmosis purification systems, the reverse osmosis membrane is used in combination with additional filtration media to provide improved removal of contaminants from the resultant purified water supply. In this regard, reverse osmosis systems are known to include filtration media disposed upstream of the reverse osmosis membrane, wherein this upstream or "prefilter" media may comprise a fibrous material and/or carbon media to remove particulate as well as selected contaminants which might otherwise be harmful to the reverse osmosis membrane. In addition, purification systems are known with filtration media disposed downstream of the reverse osmosis membrane to provide a final or "post filter" step before delivery of the purified water to a faucet valve or other point of use.

While the use of prefilter and post filter stages is generally desirable in a typical reverse osmosis purification system, such filter stages inherently increase the overall complexity and cost of the purification system by requiring appropriate housings to contain the filtration media and further requiring associated plumbing connections to obtain the desired water flow therethrough. As a result, the purification system frequently includes a relatively large number of system components which can be difficult and confusing to assemble for proper operation while avoiding water leaks at the requisite large number of plumbing connections. Moreover, after assembly, the system components are typically located in a somewhat disorganized manner beneath a kitchen sink or the like and contained within a confined cabinet space. Accordingly, post-assembly access to and identification of the system components can be difficult and confusing, particularly with respect to periodic replacement of the reverse osmosis membrane and the filtration media. Efforts to overcome these problems by connecting multiple system components to a common manifold have required multiple manifold pieces and/or complex water flow paths therein such that the manifold structures have also been relatively complicated and costly.

There exists, therefore, a significant need for improvements in reverse osmosis purification systems, particularly with respect to providing a simplified manifold of unitary construction for integrating the system components into a compact and organized package adapted for facilitated initial assembly, as well as facilitated subsequent access to reverse osmosis and associated filtration media for replacement purposes. The present invention fulfills these needs and provides further related advantages.

SUMMARY OF THE INVENTION

In accordance with the invention, an improved reverse osmosis water purification system includes a unitary header manifold for integrating multiple system components into a relatively compact and organized package adapted for facilitated assembly. The header manifold has a simplified construction with a single elongated gallery passage for directing an incoming supply of tap water or the like through a sequence of filtration and reverse osmosis stages, wherein these stages are supported by the manifold for facilitated access to and periodic replacement of filtration and reverse osmosis media. The system produces a supply of relatively purified water which is directed by the manifold to a suitable storage reservoir and/or for appropriate dispensing when desired via a faucet valve or the like, and a supply of reject water which is directed by the manifold to a suitable drain.

In the preferred form of the invention, the unitary header manifold includes a plurality of support collars adapted for removable connection as by threaded engagement with the open ends of a corresponding plurality of open-ended cylindrical canisters defining the filtration and reverse osmosis stages. Each cylindrical canister receives an associated filter or reverse osmosis cartridge which is easily accessed for periodic replacement by simple removal of the canister from the header manifold. In the preferred form, three of the cylindrical canisters are removably suspended from the header manifold in an in-line array and respectively define a prefilter stage for receiving a prefilter cartridge, a reverse osmosis stage for receiving a reverse osmosis cartridge, and a post filter stage for receiving a post filter cartridge. These cartridges are coupled with the flow passages within the header manifold to produce the purified water supply.

The header manifold is constructed from molded plastic or the like to include an inlet port at one end for connecting the incoming tap water supply to the prefilter stage for initial filtration by flow-through passage through the prefilter cartridge. Water exiting the prefilter cartridge enters the main gallery passage formed within the manifold and defined by an aligned series of stepped bores having diametric sizes which increase toward an outlet port at an opposite end of the manifold. Threaded transition segments of common thread pitch are formed between these stepped bores to receive flow control members in the form of threaded plugs and/or check valves used to direct the water flow through the reverse osmosis and post filter stages for proper system operation in the production of the purified water supply. The outlet port is adapted for connection of the purified water supply to the storage reservoir. This arrangement of stepped bores separated by threaded transition segments of common thread pitch permits the manifold gallery passage to be formed during molding by use of an elongated core pin having threaded zones to faciliate simple rotational removal of the core pin from the molded manifold.

The preferred header manifold additionally includes means for supporting a variety of control valves and related devices for regulating system operation. In this regard, a tap water shut-off valve is mounted at the downstream side of the prefilter stage to prevent tap water inflow when the storage reservoir reaches a substantially filled condition. A purified water relief valve is also provided to relieve excess purified water to the drain along with the reject water supply in the event that fluid pressure within the storage reservoir exceeds a predetermined limit. Moreover, the manifold can be adapted to receive and support electrode probes of a water purity monitor unit used to monitor system performance in removing contaminants from the incoming tap water supply.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
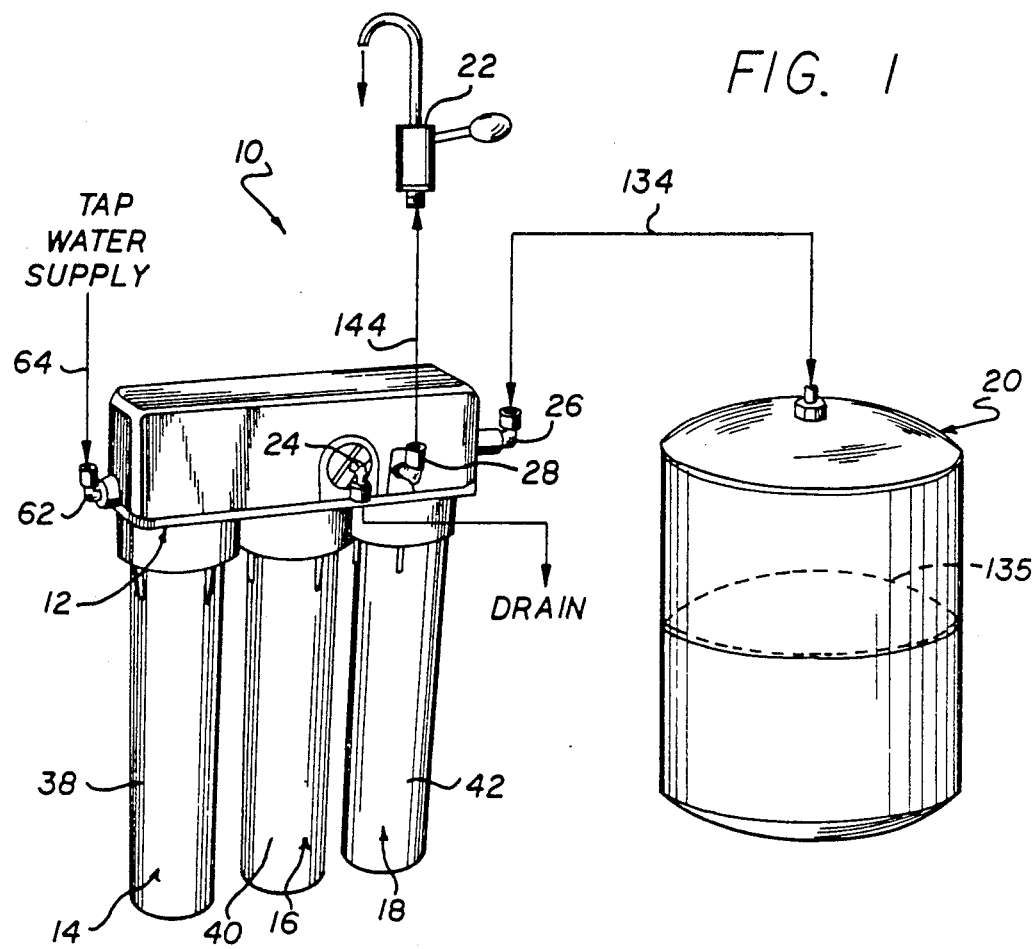
FIG. 1 is a front perspective view, partially in schematic form, illustrating the improved reverse osmosis purification system including a unitary header manifold embodying the novel features of the invention, with the header manifold shown assembled with a reverse osmosis and associated filtration stages for producing a supply of relatively purified water.

As shown in the exemplary drawings, an improved reverse osmosis purification system referred to generally in FIG. 1 by the reference numeral 10 is provided for producing relatively purified water from a supply of ordinary tap water or the like. The improved purification system 10 includes a unitary header manifold 12 for supporting and integrating the system components into a relatively compact and organized package. In particular, the header manifold 12 is adapted to receive and support a plurality of filtration and reverse osmosis processor stages identified generally by the reference numerals 14, 16 and 18, and to regulate water flow in association with these stages to produce the purified water supply. The produced purified water is collected within a suitable storage reservoir 20 and/or dispensed on demand by means of a faucet valve 22 or the like.

The reverse osmosis purification system 10 of the present invention is designed particularly for use in residential and other domestic applications to provide a ready supply of relatively purified water from ordinary tap water or the like. As is known in the art, the system 10 utilizes principles of reverse osmosis to convert the incoming tap water supply into dual water outflows comprising the relatively purified water supply having contaminants removed therefrom, and a waste or reject water supply having the contaminants or impurities concentrated therein. The produced purified water supply is normally coupled to and stored within the reservoir 20 ready for use on demand for drinking, cooking, etc. The reject water supply, often referred to as brine, is normally discharged to a suitable drain.

The illustrative drawings depict the purification system 10 to include the three processor stages 14, 16 and 18 for converting the incoming tap water supply into the separated purified and reject water supplies, as described above. In this regard, in the preferred form, the first stage 14 comprises an initial filtration or prefilter stage for flow-through passage of the tap water supply through a selected filtration media to remove contaminants and particulate therefrom. The resultant prefiltered water flow passes to the second stage 16 which comprises a reverse osmosis stage having a reverse osmosis membrane (not shown in FIG. 1). In the presence of appropriate pressure conditions, the reverse osmosis stage functions to separate the tap water supply into the purified and reject water supplies. The reject water supply is connected through a suitable drain fitting 24 for passage to the drain, whereas the purified supply is connected to the third or final stage 18 comprising a post filter stage. The purified water is connected further from the post filter stage 18 through a tank fitting 26 for collection and storage within the reservoir 20, or through a faucet fitting 28 for delivery and dispensing via the faucet valve 22.

In accordance with primary aspects of the invention, the filtration and reverse osmosis stages 14, 16 and 18 are mounted onto and supported from the unitary header manifold 12 in a manner permitting facilitated assembly and facilitated access to system components for periodic service or replacement purposes. Moreover, the header manifold 12 includes appropriate internal flow passages formed as subdivisions of a single elongated gallery passage, in combination with associated control valves for regulating water flow through the processor stages, while integrating the system components into a compact and attractive package. The entire system may be assembled quickly and easily with a relative minimum number of requisite plumbing connections. Still further, the header manifold 12 is adapted for economical production in a preferred form as a unitary plastic molding.

Figure 3:
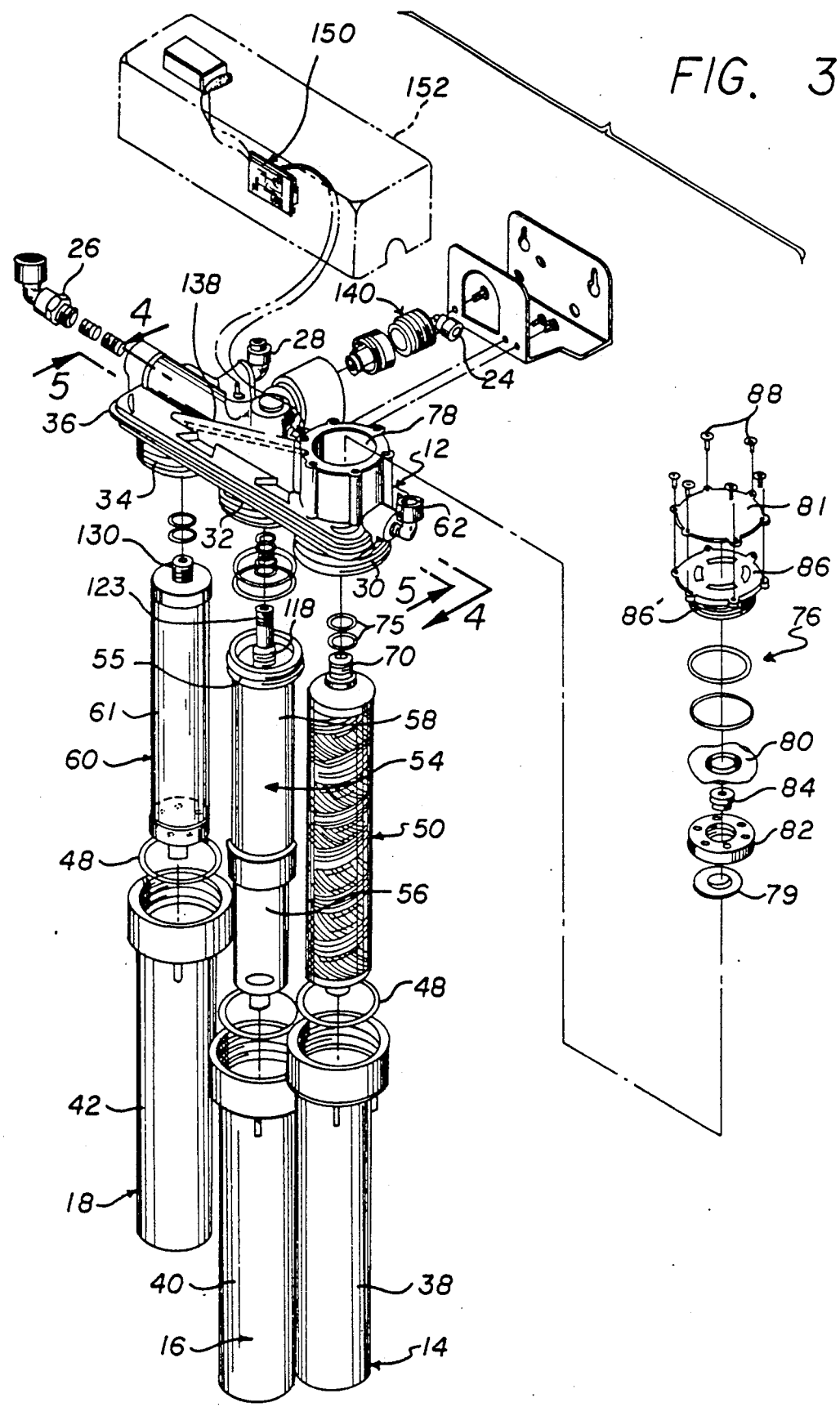
FIG. 3 is a fragmented perspective view illustrating the assembly of FIG. 2.
Figure 4:
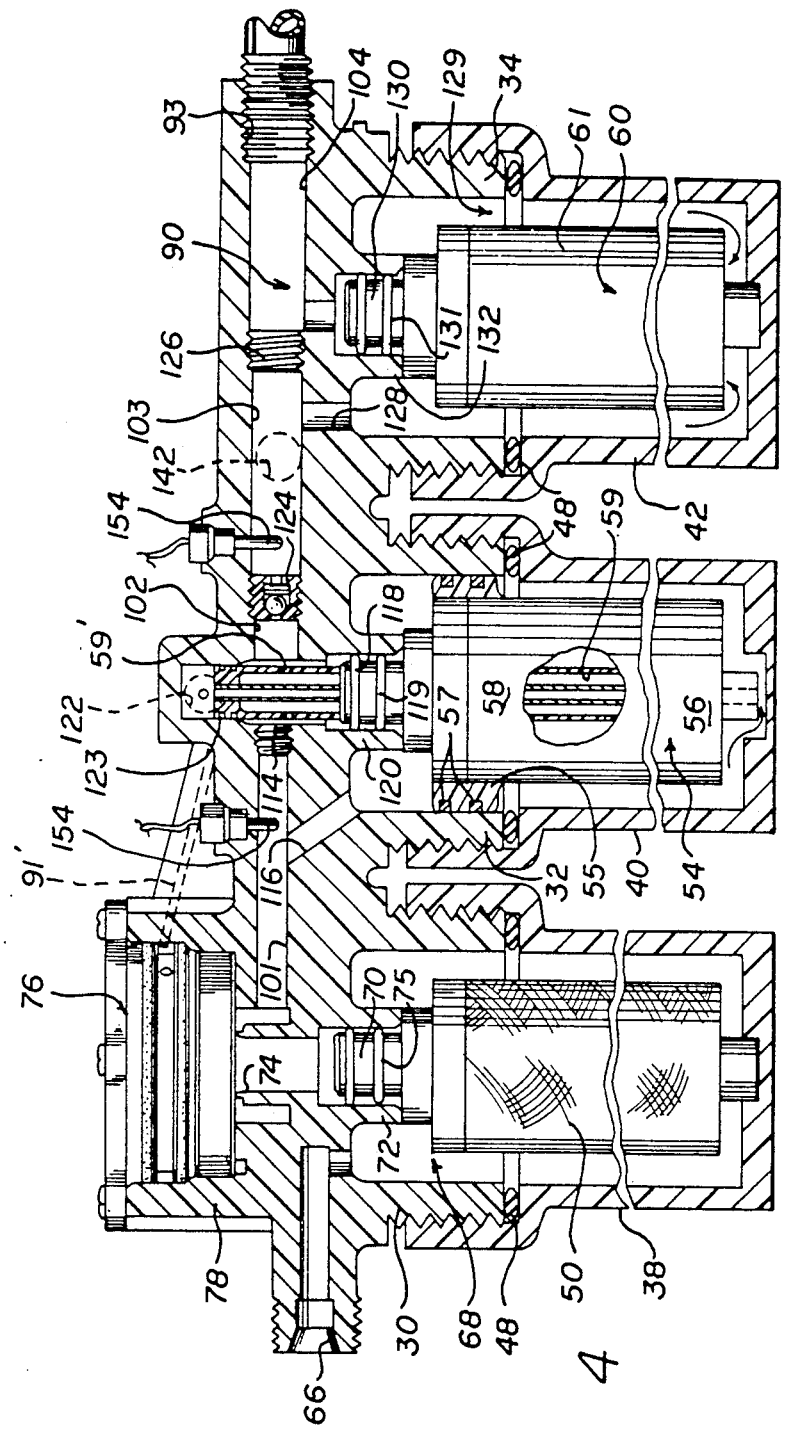
FIG. 4 is an enlarged fragmented vertical sectional view taken generally on the line 4—4 of FIG. 3.
Figure 5:
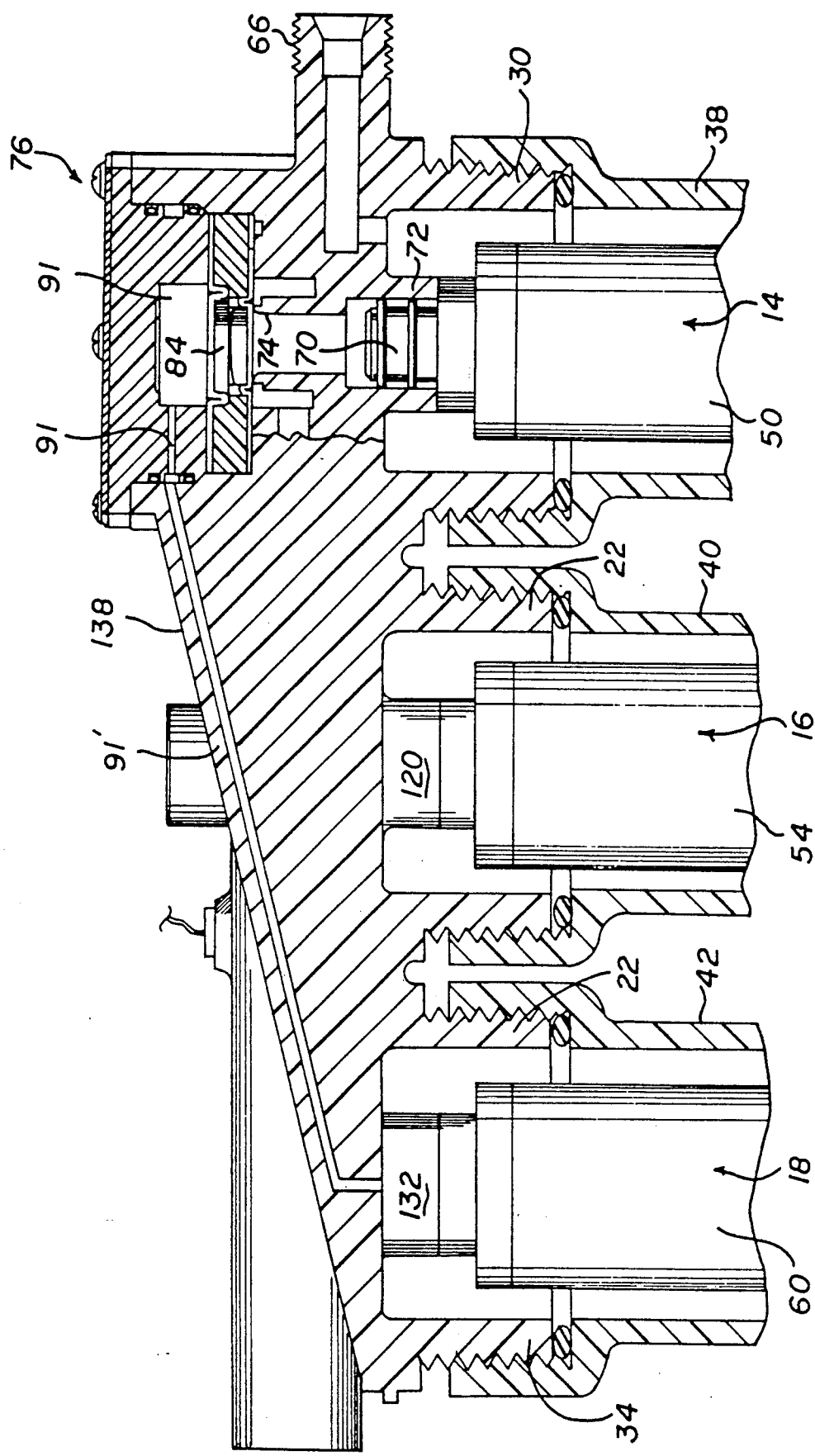
FIG. 5 is an enlarged fragmented vertical sectional view taken generally on the line 5—5 of FIG. 3.
Figure 6:
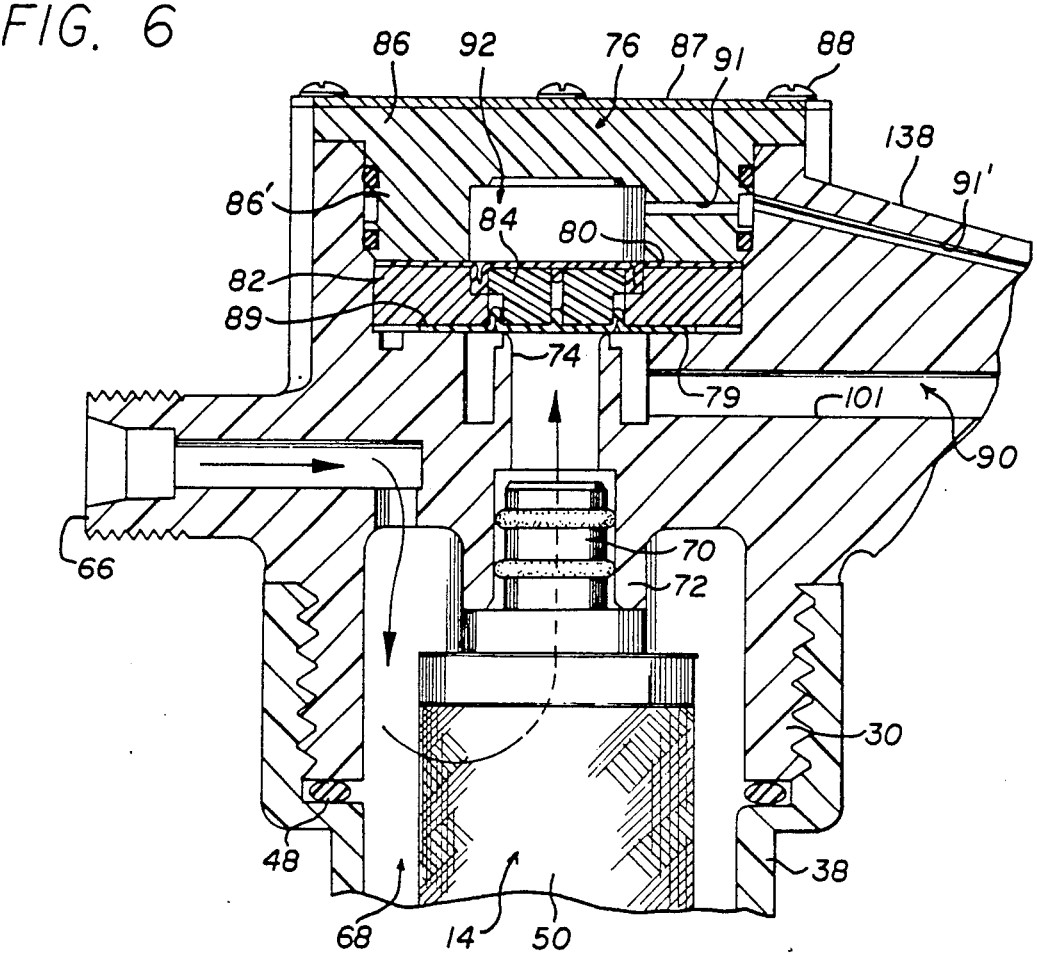
FIG. 6 is an enlarged fragmented vertical sectional view illustrating a tap water supply shut-off valve in a closed position.

As shown best in FIGS. 3-5, the header manifold 12 includes a plurality of cylindrical support collars 30, 32 and 34 formed in an in-line array to project downwardly from a manifold baseplate 36. These support collars 30, 32 and 34, which may be of identical size and shape, are adapted for removable connection to the upper open ends of a corresponding plurality of open-ended cylindrical canisters 38, 40 and 42 which are preferably identical and may also be constructed from lightweight molded plastic. While the connecting means for mounting the cylindrical canisters to the support collars may vary, the illustrative drawings show external threads on the support collars for engagement with mating internal threads at the upper ends of the cylindrical canisters. Seal rings 48 are desirably trapped between axially opposed shoulder surfaces on the support collars and the cylindrical canisters to prevent water leakage when said housings are mounted onto the header manifold.

The three cylindrical canisters 38, 40 and 42 are adapted to receive individual cartridge members forming the filtration and reverse osmosis stages, as described above. More specifically, a prefilter cartridge 50 is adapted for drop-in installation into the cylindrical canister 38 of the first stage 14, wherein the prefilter cartridge 50 may comprise a suitable filtration media such as a cylindrical canister of porous fiber material. Similarly, a reverse osmosis cartridge 54 is adapted for drop-in installation into the cylindrical canister 40 of the second stage 16, wherein the reverse osmosis cartridge 54 includes a reverse osmosis membrane 56 of a type known in the art for separating the tap water supply into the purified and reject water supplies, as previously described. In the preferred form, as shown in the illustrative drawings, the reverse osmosis cartridge 54 comprises a two stage cartridge assembly having the reverse osmosis membrane 56 located in series-flow relation with a preliminary filter section 58, as described and shown in detail in copending Ser. No. 420,929, filed Oct. 13, 1989, and incorporated by reference herein. Finally, a post filter cartridge 60 such as a cylindrical tube of activated carbon material or the like is adapted for drop-in installation into the final cylindrical canister 42 of the third stage 18. Importantly, this drop-in cartridge installation into the open-ended cylindrical canisters 38, 40 and 42 permits rapid initial assembly of the system components, and further facilitates occasional access to the various cartridges for purposes of periodic replacement.

An inlet fitting 62 at one end of the header manifold 12 provides convenient connection of a tap water supply conduit 64 to a manifold inlet port 66. As shown in FIGS. 4-7, the inlet port 66 communicates the tap water inflow through the first support collar 30 to the interior of the associated cylindrical canister 38 within a cylindrical chamber 68 surrounding the prefilter cartridge 50. The tap water flow passes in a radially inward direction through the filter material to a discharge nipple 70 at the upper end of the prefilter cartridge 50. As shown in FIG. 4, the discharge nipple 70 is adapted to seat within a short pilot sleeve 72 projecting downwardly within the support collar 30, when the prefilter stage 14 is assembled with the header manifold 12. One or more seal rings 75 are conveniently seated between the discharge nipple 70 and the pilot sleeve 72 to prevent water leakage therebetween. With this construction, tap water inflow passes through the prefilter material to remove particulate and the like from the water supply, with the thus-prefiltered tap water discharging from the prefilter cartridge 50 to a control port 74 defined by the header manifold. Moreover, the prefilter cartridge 50 is easily accessed by simple removal of the canister 38 from the header manifold to expose the cartridge 50 for removal and replacement. A fresh cartridge 50 is properly mounted with respect to the header manifold 12 and the associated pilot sleeve 72 therein by mere thread-on reconnection of the canister 38 with the manifold.

The control port 74 within the header manifold 12 is selectively opened or closed by a diaphragm-type shut-off valve 76. This shut-off valve 76 is adapted to mount within an upwardly open and generally cylindrical well 78 formed to project upwardly from the baseplate 36 of the manifold 12 at a position near the inlet fitting 62. The shut-off valve 76 includes, in the illustrative preferred form, a pair of circular resilient diaphragms 79 and 80 positioned on opposite sides of an annular support ring 82, in combination with a central valve head 84 trapped between the diaphragms and defining differential upper and lower surface areas. A valve cap 86 is received into the well 78 and is securely held therein by a cap plate 87 fastened onto the manifold by a plurality of screws 88 or the like. The valve cap 86 has an annular depending wall 86' which clamps the diaphragm support ring 82 and the peripheral margins of the two diaphragms against a manifold seat 89. The natural resiliency of the diaphragms 79 and 80 normally biases the valve head 84 toward a position with the smaller underside surface area closing the control port 74.

Figure 7:
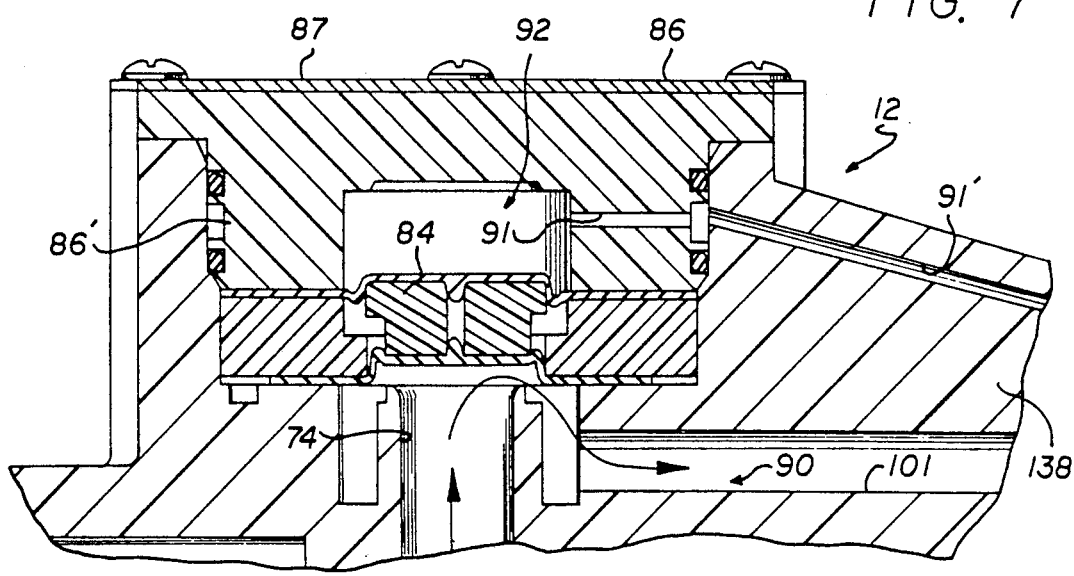
FIG. 7 is an enlarged fragmented sectional view similar to FIG. 6, but depicting the tap water shut-off valve in an open position.

When tap water is supplied under pressure to the header manifold 12 through the inlet fitting 62 and the prefilter stage 14, the water pressure acting upon the underside of the valve head displaces the valve head 84 toward an open position, as viewed in FIG. 7. In the open position, the prefiltered tap water flow is free to pass through the control port 74 to a main gallery passage 90 formed within the header manifold 12 for further processing at the reverse osmosis stage 16 and post filter stage 18, as will be described in more detail. This water flow through the control port 74 continues until the storage reservoir 20 reaches a substantially filled condition, as represented by a pressure rise in a pressure chamber 92 defined by the valve cap 86 at the upper larger side of the valve head 84. The connection of this pressure chamber 92 to purified water at a pressure level corresponding with the fluid pressure within the reservoir 20 is obtained via a pressure port 91 formed in the valve cap 86 in communication with a pure water pressure line 91' formed in the header manifold 12, as will be described in more detail. Sufficient pressure rise within the chamber 92 and acting upon the differential surface area of the valve head 84 overcomes the tap water supply pressure at the control port 74 to displace the valve head 84 toward a closed position, as viewed in FIG. 6.

As shown in FIG. 4, the main gallery passage 90 in the header manifold 12 extends linearly from the control port 74 to an outlet port 93 associated with the tank fitting 26 at the opposite end of the header manifold. In accordance with one aspect of the invention, the gallery passage 90 is subdivided into a series of stepped bores each having a diametric size which progressively increases in a direction toward the outlet port 93. The transition zone between each adjacent pair of stepped bores is each defined by a threaded segment, wherein the multiple resultant threaded segments are formed with a uniform thread pitch and an increasing diametric size in a direction toward the outlet port 93.

Figure 8:
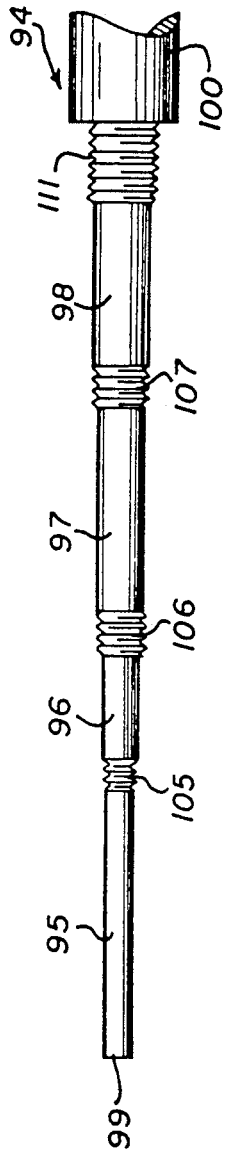
FIG. 8 is a fragmented side elevation view of a stepped core pin for use in forming the header manifold as a unitary plastic molding.

More particularly, with reference to FIGS. 4 and 8, the main gallery passage 90 within the header manifold 12 is conveniently formed during header molding by means of a unitary core pin 94 (FIG. 8). The core pin 94 includes a plurality of stepped lands 95, 96, 97 and 98 which are coaxially aligned and sized with a progressively increasing diameter from a tip end 99 to an enlarged base 100. When the header manifold 12 is formed by injection molding or the like, the stepped lands 95-98 correspondingly form the gallery passage 90 as an aligned sequence of stepped bores 101, 102, 103 and 104 in the header manifold. The core pin lands 95-98 are separated by threaded zones 105, 106, and 107 of progressively increasing diametric size, to correspondingly form threaded transition segments along the gallery passage 90. A final threaded zone 111 at the core pin base 100 may also be provided to form a threaded segment at the outlet port 93 to facilitate mounting of the tank fitting 26. By constructing the threaded zones on the core pin with common thread pitch, the core pin 94 can be separated from the molded header manifold 12 by rotatably retracting the core pin 94, with the differently sized thread segments permitting unobstructed withdrawal of the thread zones on the core pin.

As shown in FIG. 4, a threaded plug 114 is installed into the threaded segment of the downstream end of the bore 101. This plug 114 diverts the prefiltered water flow from the control port 74 through a side port 116 to the reverse osmosis stage 16 of the purification system.

The preferred reverse osmosis cartridge 54 includes a radially enlarged seal flange 55 near an upper end thereof and adapted to support one or more seal rings 57 for engaging the interior of the associated support collar 32 on the header manifold. These seal rings 57 confine the water flow to longitudinal passage in an axially downward direction through the preliminary filter section 58 and then into association with the reverse osmosis membrane 56. As shown and described in copending Ser. No. 420,929, the reverse osmosis membrane separates the tap water flow into the relatively purified water supply having impurities substantially removed therefrom, and the reject water supply having the impurities concentrated therein.

FIG. 4 shows the above-discussed reverse osmosis cartridge 54 installed within the cylindrical canister 40, with an upper discharge nipple 118 and associated seal rings 119 seated within a pilot sleeve 120 on the header manifold. In the preferred form, the produced purified water supply is passed by the membrane 56 into a central flow tube 59 of the reverse osmosis cartridge 54. This flow tube 59 extends upwardly through and beyond the discharge nozzle 118 and includes exit ports 59' for discharging the purified water into the stepped bore 102 of the gallery passage. The reject water supply passes downwardly through the lower end of the membrane 56 to enter a reject bleed tube 121 at the lower end of the cartridge 54. This bleed tube 121 passes the reject water through the central flow tube 59 in isolation with the purified water supply, and further through an upper stem 123 into a reject chamber 125 positioned within the manifold above the gallery passage 90. The reject chamber 125 is vented to permit reject water discharge flow through a reject port 122 to the drain fitting 24 (FIGS. 1 and 3). Importantly, this construction for the reverse osmosis cartridge 54 permits simple cartridge access by removal of the canister 40 from the header manifold, and correspondingly simple drop-in installation of a replacement cartridge which is operationally positioned by remounting the canister 40 onto the threaded manifold support collar 32.

The purified water supply within the gallery passage bore 102 flows through a one way check valve 124 installed at the thread segment leading into the larger bore 103. A second threaded plug 126 is mounted at the next thread segment to close the downstream end of the bore 103 and thereby diverts the purified flow through a side port 128 to the post filter stage 18.

The purified water supply flows downwardly through an annular chamber 129 defined within the support collar 34 and the associated cylindrical canister 42, and about the post filter cartridge 60. In the preferred form, the post filter cartridge 60 comprises a cylindrical tube 61 containing a suitable filtration media such as activated carbon and adapted for longitudinal water flow in an upward direction to a cartridge discharge nipple 130. Similar to the previously described cartridges, the nipple 130 carries appropriate seal rings 131 and is designed to fit into a depending pilot sleeve 132 on the header manifold when the canister 42 is threaded onto the support collar 34. From the discharge nipple 130, the purified and filter water flow passes into the final gallery bore 104 for exit passage through the outlet port 93 and an associated tank conduit 134 (FIG. 1) to the storage reservoir 20. Once again, the post filter cartridge 60 is easily accessed and replaced by mere removal of the associated canister 42 from the header manifold.

The illustrative storage reservoir 20 includes internal upper and lower chambers separated by a resilient diaphragm or bladder 135. As is known in the art, the purified water supply is coupled for flow into and storage within one of these chambers, such as the upper chamber as depicted in FIG. 1, with the other chamber being precharged with compressed air or the like to maintain the purified water supply under pressure. The pressure applied to the purified water supply thus increases with the quantity of water contained within the reservoir 20, and this pressure is communicated through the conduit 134 to the post filter stage 18 and the associated bore segments 103 and 104 within the header manifold. The pressure line 91' (FIGS. 3-7) opens into one of these bore segments and extends through a bridge member 138 to communicate the pure water pressure to the pressure chamber 92 of the shut-off valve 76. In this regard, the differential surface areas of the valve head 84 of the shut-off valve 76 are chosen such that the valve closes each time the reservoir 20 reaches a substantially filled condition.

Overpressurization of the storage reservoir 20 is prevented by use of a pure water pressure relief valve unit 140 (FIG. 3). This relief valve unit 140 is preferably constructed according to the relief valve shown and described in U.S. Pat. No. 4,880,534, which is incorporated by reference herein. The relief valve unit 140 is mounted along the drain path of the reject water supply and includes a movable valve member responsive to purified water pressure above a set threshold to bleed excess purified water to the drain.

The faucet fitting 28 (FIG. 1) is connected via a faucet port 142 (FIG. 4) to the stepped bore 103 within the header manifold 12. This faucet fitting 28 couples the purified water through an associated conduit 144 to the faucet valve 22. When the faucet valve is closed, produced purified water passes the port 142 for flow through the post filter stage 18 to the storage reservoir 20. However, when dispensing of purified water is desired, manual opening of the faucet valve 22 causes the purified water to flow through the faucet port 142 to the faucet valve 22 for dispensing. In this regard, the gas pressure applied to the bladder 135 within the reservoir 20 provides the driving force for dispensing the purified water. Water delivered from the reservoir 20 backflows through the conduit 134 and through the post filter cartridge 60 to the faucet port 142.

The unitary header manifold 12 of the present invention thus provides a single header structure adapted to support the various processor stages of the water purification system in a compact and integrated assembly, with the common gallery passage providing flow communication to the various processor stages. The various stage cartridges are quickly and easily accessed by simple removal of their associated cylindrical canisters to permit cartridge inspection and/or replacement as required for proper system operation. In addition, the manifold 12 supports the necessary flow control and regulatory valve structures for obtaining proper system operation.

Figure 2:
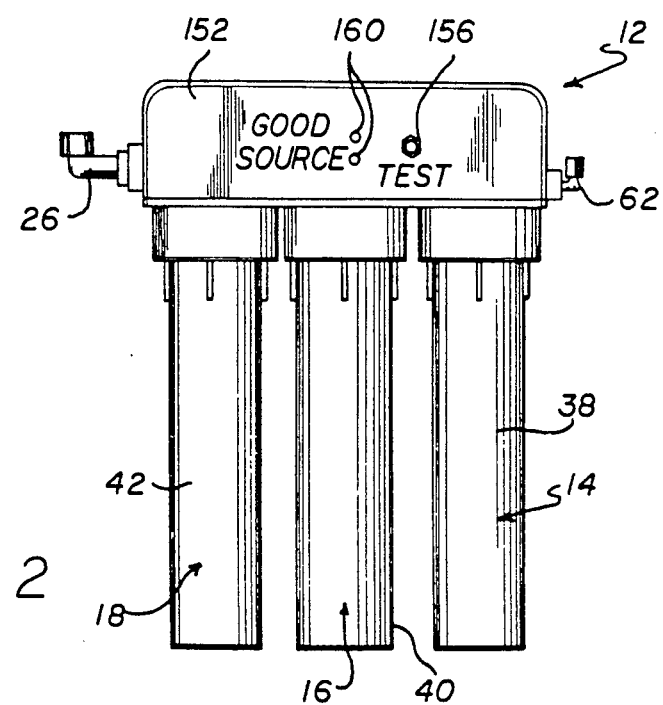
FIG. 2 is a rear elevation view of the header manifold in assembled relation with the reverse osmosis and associated filtration stages.

The purification system 10 may further include means for monitoring or testing the performance of the reverse osmosis stage 16 in removing contaminants from the tap water supply. In this regard, a conductivity monitor unit 150 (FIG. 3) can be conveniently installed within a manifold cover 152, wherein the conductivity monitor unit may be constructed according to copending Ser. No. 491,310, filed Mar. 9, 1990, and incorporated by reference herein. The conductivity monitor includes electrode probes 154 (FIG. 4) mounted onto the manifold to project into the gallery bores 101 and 103 at opposite sides of the reverse osmosis stage. With this construction, comparative conductivity readings may be obtained upon depression of an actuator button 156 (FIG. 2), for suitable display on indicator lights 160, thereby providing a direct visual readout of system performance.

Other modifications and improvements to the invention will be apparent to those skilled in the art. Accordingly, no limitation on the invention is intended by way of the foregoing description and accompanying drawings, except as set forth in the appended claims.

What is claimed is:

1. A reverse osmosis water purification system for receiving a tap water supply or the like and for producing therefrom a relatively purified water supply having impurities substantially removed therefrom, said system comprising:
 a unitary header manifold designed for facilitating molding thereof, adapted for connection to and to receive the tap water supply;
 a reverse osmosis stage having a reverse osmosis membrane for separating the tap water supply into the purified water supply and a reject water supply having impurities concentrated therein;
 at least one filter stage having filter means for filtering a selected one of the tap water supply and the purified water supply;
 said reverse osmosis stage and said at least one filter stage being removably mounted onto said header manifold to permit replacement access to said reverse osmosis membrane and to said filter means;
 said header manifold defining internal passage means for water flow in series through said reverse osmosis and filter stages, said internal passage means including an elongated gallery passage formed in said manifold, and further including flow control members mounted at spaced positions along said gallery passage to control the water flow in series through said stages;
 reservoir means for receiving and storing the purified water supply; and
 dispenser means for dispensing the purified water supply.

2. The reverse osmosis purification system of claim 1 wherein said reverse osmosis membrane and said filter means respectively comprise replaceable cartridges.

3. The reverse osmosis purification system of claim 1 wherein said reverse osmosis stage comprises an open-ended canister, and means for removably mounting said canister onto said header manifold, said reverse osmosis membrane comprising a reverse osmosis cartridge adapted for drop-in installation into said canister.

4. The reverse osmosis purification system of claim 1 wherein said at least one filter stage comprises an open-ended canister and means for removably mounting said canister onto said header manifold, said filter means comprising a filter cartridge adapted for drop-in installation into said canister.

5. The reverse osmosis purification system of claim 1 wherein:
 said reverse osmosis stage comprises a first canister having an open end and a closed end, and means for removably mounting said first canister onto said header manifold, said reverse osmosis membrane comprising a reverse osmosis cartridge adapted for drop-in installation into said first canister when said first canister is removed from said header manifold, said reverse osmosis cartridge and said header manifold including means for connecting said reverse osmosis cartridge in flow communication with the tap water supply to produce the purified and reject water supplies when said first canister is mounted onto said header manifold; and
 said at least one filter stage comprises a second canister having an open end and a closed end, and means for removably mounting said second canister onto said header manifold, said filter means comprising a filter cartridge adapted for drop-in installation into said second canister when said second canister is removed from said header manifold, said filter cartridge and said header manifold including means for connecting the filter cartridge in flow communication with the selected one of the tap and purified water supplies when said second canister is mounted onto said header manifold.

6. The reverse osmosis purification system of claim 5 wherein said first and second canisters are suspended from said header manifold in a substantially in-line array.

7. The reverse osmosis purification system of claim 5 wherein said means for mounting said first and second canisters each includes mounting threads adjacent the open ends thereof, and wherein said header manifold includes threaded collars for thread-on removable mounting of said first and second canisters.

8. The reverse osmosis purification system of claim 5 wherein said second canister is mounted onto said header manifold to position said filter cartridge in flow communication with the tap water supply upstream from said reverse osmosis stage.

9. The reverse osmosis purification system of claim 5 wherein said second canister is mounted onto said header manifold to position said filter cartridge in flow communication with the purified water supply downstream from said reverse osmosis stage.

10. The reverse osmosis purification system of claim 1 wherein said elongated gallery passage is subdivided into a plurality of generally coaxial bores of progressively increasing diametric size in a direction toward an open end thereof, said bores being separated by transition segments, said flow control members being mounted within said transition segments and cooperating with said flow control members to control the water flow in series through said stages.

11. The reverse osmosis purification system of claim 10 wherein said transition segments are threaded with a common thread pitch, and further wherein said flow control members comprise threaded members.

12. The reverse osmosis purification system of claim 10 wherein:
said reverse osmosis stage comprises a first canister having an open end and a closed end, and means for removably mounting said first canister onto said header manifold, said reverse osmosis membrane comprising a reverse osmosis cartridge adapted for drop-in installation into said first canister when said first canister is removed from said header manifold, said reverse osmosis cartridge and said header manifold including means for connecting said reverse osmosis cartridge in flow communication with the tap water supply to produce the purified and reject water supplies when said first canister is mounted onto said header manifold;
said at least one filter stage comprising a prefilter stage for filtering the tap water supply upstream from said reverse osmosis stage, and a post filter stage for filtering the purified water supply downstream from said reverse osmosis stage;
said prefilter stage comprising a second canister having an open end and a closed end, and means for removably mounting said second canister onto said header manifold, said filter means for said prefilter stage comprising a prefilter cartridge adapted for drop-in installation into said second canister when said second canister is removed from said header manifold, said prefilter cartridge and said header manifold including means connecting said prefilter cartridge in flow communication with the tap water supply when said second canister is mounted onto said header manifold; and
said post filter stage comprising a third canister having an open end and a closed end, and means for removably mounting said third canister onto said header manifold, said filter means for said post filter stage comprising a post filter cartridge adapted for drop-in installation into said third canister when said third canister is removed from said header manifold, said post filter cartridge and said header manifold including means connecting said post filter cartridge in flow communication with the purified tap water supply when said third canister is mounted onto said header manifold.

13. The reverse osmosis purification system of claim 12 wherein said first, second and third canisters are removably mounted onto said header manifold in a substantially in-line array.

14. The reverse osmosis purification system of claim 10 further including a shut-off valve unit mounted on said header manifold and responsive to the pressure of the purified water supply to prevent tap water inflow to said reverse osmosis stage.

15. The reverse osmosis purification system of claim 10 further including a purified water supply relief valve unit mounted on said header manifold and responsive to the pressure of the purified water supply within said reservoir means for preventing overpressurization of said purified water supply.

16. The reverse osmosis purification system of claim 10 further including a drain fitting on said header manifold for connecting the reject water supply to a drain.

17. The reverse osmosis purification system of claim 10 further including a reservoir fitting on said header manifold for connecting the purified water supply to said reservoir means, and a dispense fitting on said header manifold for connecting the purified water supply to said dispenser means.

18. The reverse osmosis purification system of claim 10 wherein said header manifold comprises a unitary plastic molding.

19. A reverse osmosis water purification system for receiving a tap water supply or the like and for producing therefrom a relatively purified water supply having impurities substantially removed therefrom, said system comprising;
a prefilter cartridge;
a reverse osmosis cartridge;
a post filter cartridge;
a plurality of canisters each having an open end and a closed end and adapted for drop-in installation of a respective one of said cartridges;
a unitary header manifold designed for facilitating molding thereof, adapted for connection to and to receive the tap water supply;
means for removably mounting said canisters with said cartridges therein onto said header manifold, said cartridges cooperating with said header manifold for passage of the tap water supply in sequence through said prefilter cartridge for prefiltering, and to said reverse osmosis cartridge for separating the tap water supply into the purified water supply and a reject water supply having impurities concentrated therein, and for passage of the purified water supply through said post filter cartridge for further filtering;
said header manifold defining internal passage means including an elongated gallery passage formed in said manifold and subdivided into a plurality of generally coaxial bores of progressively increasing diametric size in direction toward an open end thereof, said bores being separated by threaded transition segments of common thread pitch, and further including threaded members mounted within said transition segments and cooperating with said bores to control the water flow in series through said cartridges;
reservoir means for receiving and storing the purified water supply; and
dispenser means for dispensing the purified water supply.

20. The reverse osmosis purification system of claim 19 further including a shut-off valve unit mounted on said header manifold and responsive to the pressure of the purified water supply to prevent tap water inflow to said reverse osmosis stage.

21. The reverse osmosis purification system of claim 19 further including a purified water supply relief valve unit mounted on said header manifold and responsive to the pressure of the purified water supply within said reservoir means for preventing overpressurization of said purified water supply.

22. The reverse osmosis purification system of claim 19 further including a drain fitting on said header manifold for connecting the reject water supply to a drain.

23. The reverse osmosis purification system of claim 19 further including a reservoir fitting on said header manifold for connecting the purified water supply to said reservoir means, and a dispense fitting on said header manifold for connecting the purified water supply to said dispenser means.

24. A water filtration and treatment system for receiving a tap water supply or the like and for producing therefrom a relatively purified water supply having impurities substantially removed therefrom, said system comprising:
- a unitary header manifold designed for facilitating molding thereof, adapted for connection to and to receive the tap water supply;
- a plurality of filter treatment stages each including means for treating water passing therethrough and being separately removably mounted onto said header manifold to permit replacement access to each of said treating means;
- said header manifold defining internal passage means for water flow in series through each of said filter treatment stages, said internal passage means including an elongated gallery passage formed in said manifold, and further including flow control members mounted at spaced positions along said gallery passage to control the water flow in series through said stages;
- reservoir means for receiving and storing the purified water supply; and
- dispenser means for dispensing the purified water supply.

25. The system of claim 24 wherein each of said stages comprises an open-ended canister, and means for removably mounting said canister onto said header manifold, said treating means for each of said stages comprising a cartridge adapted for drop-in installation into said canister.

26. The system of claim 24 wherein said header manifold further defines a plurality of side ports communicating between said gallery passage and said stages and wherein said flow control members comprise a plurality of plugs mounted along said gallery passage.

* * * * *